United States Patent [19]

Lubbers

[11] Patent Number: 5,770,990
[45] Date of Patent: Jun. 23, 1998

[54] MICROWAVE WINDOW

[75] Inventor: Wilhelm Lubbers, Duisburg, Germany

[73] Assignee: Krohne Messtechnik GmbH & Co. KG, Duisburg, Germany

[21] Appl. No.: 749,658

[22] Filed: Nov. 15, 1996

[30] Foreign Application Priority Data

Nov. 15, 1995 [DE] Germany .................. 195 42 525.1

[51] Int. Cl.$^6$ .................................................. H01P 1/08
[52] U.S. Cl. ............................................. 333/252; 333/34
[58] Field of Search .................... 333/230, 252; 315/39.53

[56] References Cited

U.S. PATENT DOCUMENTS

| | | | |
|---|---|---|---|
| 2,422,189 | 6/1947 | Fiske | 333/252 |
| 2,883,631 | 4/1959 | Blackadder et al. | 333/252 |
| 3,001,160 | 9/1961 | Trousdale | 333/252 |
| 3,032,727 | 5/1962 | Latham et al. | 333/252 |
| 3,281,729 | 10/1966 | Kato et al. | |
| 4,688,009 | 8/1987 | Ferguson et al. | 333/252 |
| 4,985,659 | 1/1991 | Tikes et al. | 333/252 X |
| 5,115,218 | 5/1992 | Jean | 333/252 |
| 5,136,272 | 8/1992 | Kormann et al. | 333/252 |
| 5,471,182 | 11/1995 | Rivera et al. | 333/252 |

FOREIGN PATENT DOCUMENTS

| | | |
|---|---|---|
| 2 478 869 | 9/1981 | France . |
| 821772 | 10/1959 | United Kingdom . |
| 908808 | 10/1962 | United Kingdom . |
| 2 082 844 | 7/1980 | United Kingdom . |

*Primary Examiner*—Paul Gensler
*Attorney, Agent, or Firm*—Cesari and McKenna, LLP

[57] ABSTRACT

A microwave window includes a transparent disk made of glass or ceramic that lets microwaves through and an attachment device made of metal that is used to attach the transparent disk. This microwave window is characterized by the fact that the transparent disk of glass is sealed into the attachment device or the transparent disk of ceramic is sintered into the attachment device.

8 Claims, 2 Drawing Sheets

MICROWAVE WINDOW

The invention concerns a microwave window with a disk made of glass or ceramic that is transparent to microwaves and a means for attachment made of metal used to attach the transparent disk.

BACKGROUND OF THE INVENTION

Such microwave windows are know from the state of the art (see DE-C-41 00 922 and DE A-43 36 494). Such microwave windows are used to separate a microwave sending device from a target, usually found in a container, usually a liquid or solid medium. Such arrangements are used especially in industrial plants for measuring fill status according to the radar principle. Generally specific requirements are set for the mechanical parts of such industrial fill-status measuring systems which can come in contact with the medium in the container or the accompanying atmosphere. In such a container, there may be low pressure or high excess pressures, explosive atmospheres, very high or very low temperatures, aggressive and corrosive media. A microwave window, on which the invention is based, is used to protect the microwave sending device, especially with its sensitive electronic components, from the influences of conditions in the container storing the medium.

In the microwave windows known from the state of the art, the transparent disk that is permeable to microwaves is tensed between the metal means of attachment and, for example, the container wall using suitable sealing means, to make a tight, pressure-tight and temperature-resistant junction for the microwave radiation in the container.

In the known microwave windows, the problem is that the structures are relatively expensive and that no conditions can be created that guarantee microwave radiation can pass through the microwave window free of interference.

SUMMARY OF THE INVENTION

The task of the invention is, therefore, to simplify and at the same time to guarantee the construction of a microwave window that guarantees the passage of microwave radiation through the microwave window as free of interference as possible.

The task described above is solved by the invention by having the transparent disk made of glass sealed in the means of attachment or the transparent disk of ceramic sintered into the means of attachment. The one-piece design of the microwave window in the invention guarantees that it can be mounted with no problem. The one-piece design of the microwave window in the invention also guarantees that the junction between the microwave-transparent disk and the metal means of attachment can be chosen regardless of the specifications for its ability to be mechanically attached.

To guarantee responsive optimal transparency of the transparent disk for microwave radiation, the microwave window in the invention is designed so that the outer diameter of the disk corresponds to the inner diameter of the microwave conductor holding the microwave window. Such a design is not possible with the microwave windows known from the state of the art, since in the known microwave windows in such a case, the mechanical, interlocking attachment of the microwave window can no longer be guaranteed. Such a design is primarily advantageous for the microwave window to microwave radiation since the microwave radiation thus "sees" a microwave conductor with a continual diameter, and so no reflections occur at changes in the cross section.

In order to guarantee the fewest possible junctions in the wall of a microwave conductor carrying microwave radiation, the microwave window in the invention is designed especially advantageously so that the means of attachment is designed in one piece with the wall of the container holding the medium being monitored by means of a microwave signal. In such a case, it is no longer necessary to screw the microwave window to the container, so that a junction in the surface of the wall of the microwave conductor is not necessary.

Another increase in the transparency of the microwave window to microwave radiation is guaranteed by the fact that there is a matching element made of dielectric material on at least one side of the transparent window to adjust impedance. By choosing the form and the material for the matching element(s) appropriately, the transparency of the microwave window to microwave radiation can be increased as desired.

Alternately to attaching matching elements, the microwave window in the invention has a preferred embodiment in which the transparent disk is designed as the matching element to adjust impedance. This measure eliminates the junctions between the matching elements and the transparent disk, and hence another possibility for reflections of the microwave radiation in the area of the microwave window.

A microwave window designed to be plane is also improved with regard to its transparency to microwave radiation by having the thickness of the transparent disk an integral multiple of the wavelength of the microwaves. In such an embodiment of the transparent disk, of course, the relative permittivity of the material of the transparent disk and the propagation velocity of the microwave radiation within the microwave conductor must be considered.

BRIEF DESCRIPTION OF THE DRAWINGS

Now there are many ways of designing and developing the microwave window in the invention. For them, please refer, on one hand, to the patent claims subordinate to patent claim 1, and, on the other hand, to the description of the preferred examples of embodiment and the following drawings, in which:

DETAILED DESCRIPTION OF THE PREFERRED EMBODIMENT

Figure 1:
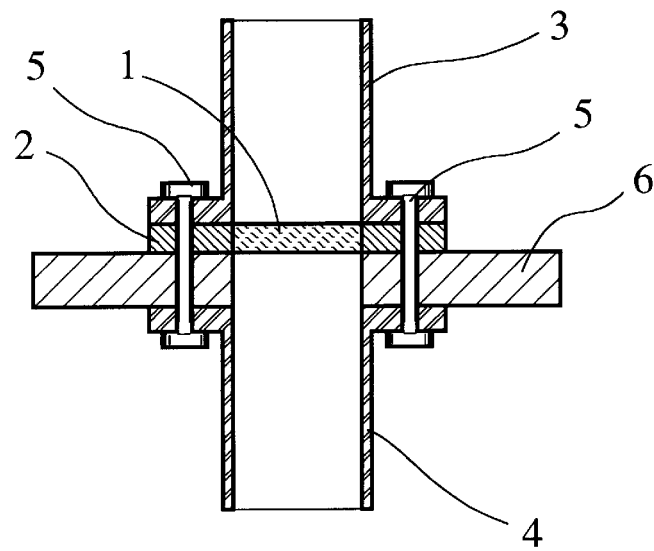
FIG. 1 shows in section the arrangement of a first example of embodiment of a microwave window according to the invention connected to a microwave conductor and a container.

The drawing in FIG. 1 shows a microwave window according to the invention with a transparent disk 1 that lets microwaves through and with means of attachment 2 used to attach the transparent disk 1, here an attachment ring made of metal. The transparent disk 1 made of glass is sealed into the means of attachment 2 in the invention. The disc 1 could also be of ceramic sintered into the attachment ring. The means of attachment 2 is connected, along with an outside microwave conductor 3 and an inner microwave conductor 4, by several connecting elements 5 to the wall 6 of a container, shown only in cutout, holding the medium being monitored.

FIG. 1 clearly shows that the outer diameter of the transparent disk 1 corresponds to the inner diameter of the outer microwave conductor 3 and that the inner microwave conductor 4 is separated from the outer microwave conductor 3 by the microwave window.

Figures 2, 3:
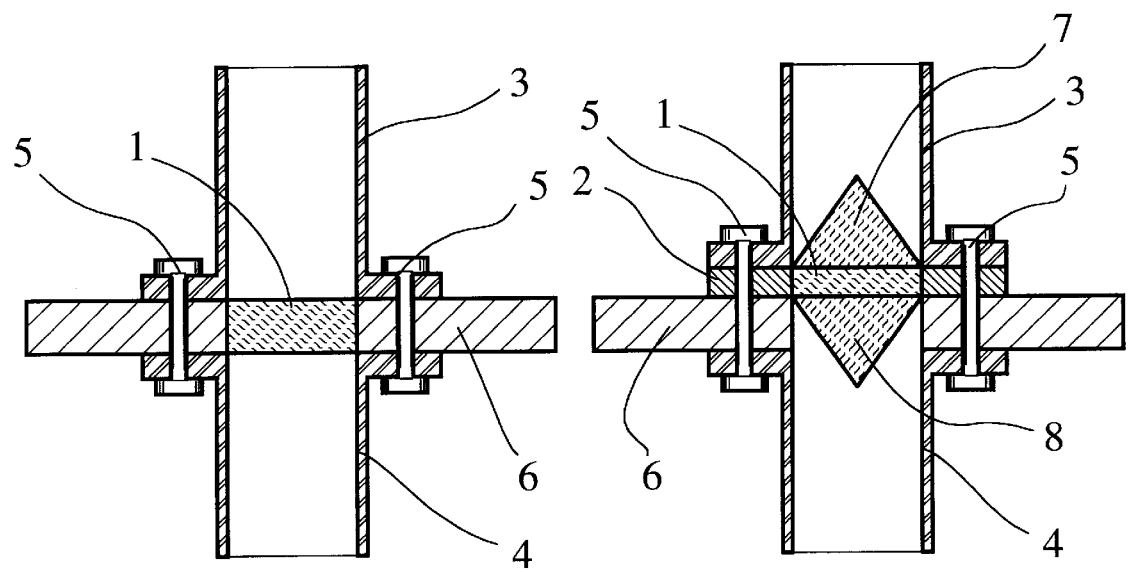
FIG. 2 shows in section the arrangement of a second example of embodiment of a microwave window according to the invention connected to a microwave conductor and a container.
FIG. 3 shows in section the arrangement of a third example of embodiment of a microwave window according to the invention connected to a microwave conductor and a container.

FIG. 2 shows a second example of embodiment of a microwave window according to the invention, in which the means of attachment is designed in one piece with the wall 6 of the container holding the medium. The transparent disk 1, which is in turn made of glass here, is thus sealed directly into the wall 6. Alternatively, a ceramic disc may be sintered into wall 6. As can be seen clearly in FIG. 2, this guarantees that the wall of the microwave conductor is now interrupted by two instead of three junctions, as in FIG. 1. Since each transition in the wall of the microwave conductor causes reflections of the microwave signal, a higher transparency of the microwave window to microwave radiation is thus guaranteed.

In the third example of embodiment of a microwave window according to the invention shown in FIG. 3, on both sides of the transparent disk 1, there is a matching element 7, 8 made of dielectric material. These matching elements 7, 8 are used to adjust the impedance of the microwave window to the impedance of the outside microwave conductor 3 or the inside microwave conductor 4.

Figure 4:
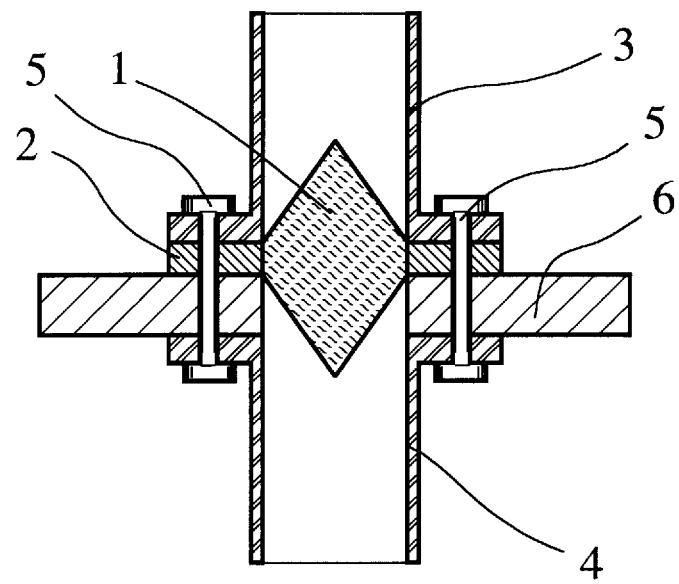
FIG. 4 shows in section the arrangement of a fourth example of embodiment of a microwave window according to the invention connected to a microwave conductor and a container.

Such adjustment of impedance can also be guaranteed alternately to the example of embodiment shown in FIG. 3 by having the transparent disk 1 itself designed as the matching element as shown in the example of embodiment in FIG. 4.

Figure 5:
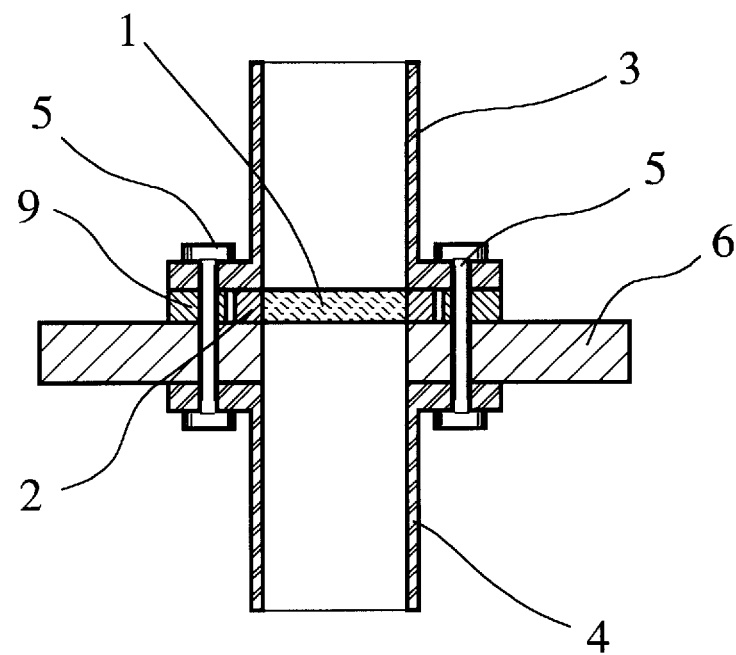
FIG. 5 shows in section the arrangement of a fifth example of embodiment of a microwave window according to the invention connected to a microwave conductor and a container.

FIG. 5 shows a fifth example of embodiment of a microwave window according to the invention, in which a metal ring 9 is arranged between the outer microwave conductor 3 and the wall 6 of the container in such a way that the means of attachment 2 can be guaranteed to be placed between the outer microwave conductor 3 and the wall 6 of the container with no tension. This is achieved by having the thickness of the metal ring 9 slightly larger than the thickness of the means of attachment 2.

All planar transparent disks 1 shown in the drawing figures are adjusted to the microwave radiation in terms of their thickness.

What is claimed is:

1. A microwave window for spatial separation and microwave connection of a first hollow microwave conductor (3) from or to a second hollow microwave conductor (4), said conductors attached to opposite sides of opening in a (6) a glass transparent disk (1) transparent to microwaves and a metallic means of attachment (2) serving to attach the transparent disk (1) to said wall (6), wherein the outer diameter of the transparent disk (1) corresponds to the inner diameter of the microwave conductors (3, 4) that receive the microwave window and the means of attachment (2) are made in a ring shape and the glass transparent disk (1) is melted into the means of attachment (2).

2. A microwave window for spatial separation and microwave connection of a first hollow microwave conductor (3) from or to a second hollow microwave conductor (4), said conductors attached to opposite sides of opening in a ceramic transparent disk (1), transparent to microwaves a metallic means of attachment (2) serving to attach the transparent disk (1) to said wall (6), wherein the outer diameter of the transparent disk (1) corresponds to the inner diameter of the microwave conductors (3, 4) that receive the microwave window and the means of attachment (2) are made in a ring shape and the ceramic transparent disk (1) is sintered into the means of attachment (2).

3. A microwave window for spatial separation and microwave connection of a first hollow microwave conductor (3) from or to a second hollow microwave conductor (4), with a glass transparent disk (1), the first and second microwave conductors (3, 4) being provided on opposite sides of an opening in a wall (6), wherein the outer diameter of the transparent disk (1) corresponds to the inner diameter of the microwave conductors (3, 4) that receive the microwave window and the glass transparent disk (1) is sealed into means of attachment (2) connected to the wall (6) between the outer and inner microwave conductors (3, 4).

4. A microwave window for spatial separation and microwave connection of a first hollow microwave conductor (3) from or to a second hollow microwave conductor (4), with a ceramic transparent disk (1), the first and second microwave conductors (3, 4) being provided on opposite sides of an opening in a wall (6), wherein the outer diameter of the transparent disk (1) corresponds to the inner diameter of the microwave conductors (3, 4) that receive the microwave window and the ceramic transparent disk (1) is sintered into the means of attachment (2) connected to the wall (6) between the outer and inner microwave conductors (3, 4).

5. The microwave window according to any one of claims 1 through 4 wherein the thickness of the transparent disk (1) is an integral multiple of the wavelength of the microwaves.

6. The microwave window according to any one of claims 1 through 4 wherein in order to adapt the surge impedance of the transparent disk (1) to the surge impedance of the microwave conductors (3, 4), an adjustment body (7, 8) consisting of dielectric material is provided on at least one side of the transparent disk (1).

7. The microwave window according to claim 6 wherein the transparent disk (1) and the adjustment body or adjustment bodies (7, 8) is made as a single piece.

8. The microwave window according to claim 1 or 2 and further including a metal ring (9) surrounding the means of attachment (2), the thickness of said metal ring (9) being slightly greater than the thickness of the means of attachment (2).

* * * * *